US012177697B2

(12) United States Patent
Ginis et al.

(10) Patent No.: US 12,177,697 B2
(45) Date of Patent: Dec. 24, 2024

(54) METHOD AND APPARATUS FOR EVALUATING A RADIO FREQUENCY FOR USE IN A CELL-AREA OF A WIRELESS NETWORK

(71) Applicant: Sail Internet, Inc., Fremont, CA (US)

(72) Inventors: Georgios Ginis, San Mateo, CA (US); Kevin Dean Fisher, Palo Alto, CA (US)

(73) Assignee: Sail Internet, Inc., Palo Alto, CA (US)

( * ) Notice: Subject to any disclaimer, the term of this patent is extended or adjusted under 35 U.S.C. 154(b) by 621 days.

(21) Appl. No.: 17/285,880

(22) PCT Filed: Oct. 8, 2019

(86) PCT No.: PCT/US2019/055261
§ 371 (c)(1),
(2) Date: Apr. 15, 2021

(87) PCT Pub. No.: WO2020/081302
PCT Pub. Date: Apr. 23, 2020

(65) Prior Publication Data
US 2021/0352502 A1 Nov. 11, 2021

Related U.S. Application Data

(60) Provisional application No. 62/746,417, filed on Oct. 16, 2018.

(51) Int. Cl.
*H04W 24/08* (2009.01)
*H04B 17/318* (2015.01)
*H04B 17/336* (2015.01)

(52) U.S. Cl.
CPC .......... *H04W 24/08* (2013.01); *H04B 17/318* (2015.01); *H04B 17/336* (2015.01)

(58) Field of Classification Search
None
See application file for complete search history.

(56) References Cited

U.S. PATENT DOCUMENTS 5,890,076 A 3/1999 Takano et al.
7,127,212 B2 10/2006 Fattouch
(Continued)

FOREIGN PATENT DOCUMENTS

CA 3106147 A1 1/2020
CA 3116873 A1 4/2020
(Continued)

OTHER PUBLICATIONS

Machine Translation of WO-2016086669-A1 (Foreign Patent Document N above) (Year: 2016).*
(Continued)

*Primary Examiner* — Benjamin Lamont
(74) *Attorney, Agent, or Firm* — Elliott, Ostrander & Preston, P.C.

(57) ABSTRACT

Evaluating a radio frequency for user in a selected cell-area in a wireless network that is or will be served by a base-station operating at the radio frequency involves identifying user equipment within the selected cell-area that are or can be served by the base-station, identifying potentially interfering devices operating at the same radio frequency as the base-station, and estimating an interference impact from the identified potentially interfering devices to communication between the base-station and the identified user equipment.

19 Claims, 11 Drawing Sheets

(56) References Cited

U.S. PATENT DOCUMENTS

| | | |
|---|---|---|
| 7,499,890 B1 | 3/2009 | Allen |
| 8,983,470 B1* | 3/2015 | Ryan .................... H04W 24/02 |
| | | 455/437 |
| 9,602,224 B1 | 3/2017 | McLaughlin et al. |
| 10,021,576 B1 | 7/2018 | Mclaughlin et al. |
| 10,271,229 B1 | 4/2019 | McLaughlin et al. |
| 2003/0023412 A1 | 1/2003 | Rappaport et al. |
| 2004/0235484 A1 | 11/2004 | Korpela et al. |
| 2009/0125356 A1 | 5/2009 | Allen |
| 2009/0244070 A1 | 10/2009 | Mattikalli et al. |
| 2012/0147782 A1 | 6/2012 | Puthenpura et al. |
| 2013/0176881 A1 | 7/2013 | Fan et al. |
| 2014/0162627 A1 | 6/2014 | Tarokh et al. |
| 2014/0365409 A1 | 12/2014 | Burch et al. |
| 2015/0029176 A1 | 1/2015 | Baxter et al. |
| 2015/0341502 A1 | 11/2015 | Udeshi et al. |
| 2016/0037550 A1 | 2/2016 | Barabell et al. |
| 2017/0171762 A1* | 6/2017 | Reis ...................... H04W 72/51 |
| 2018/0025452 A1 | 1/2018 | Fadeev et al. |
| 2018/0316416 A1* | 11/2018 | Reis ......................... H01Q 3/02 |
| 2020/0367067 A1* | 11/2020 | Haley .................. H04B 17/318 |
| 2021/0250778 A1 | 8/2021 | Tsutsui |
| 2021/0289366 A1 | 9/2021 | Ginis et al. |
| 2021/0352502 A1 | 11/2021 | Ginis et al. |
| 2022/0110001 A1 | 4/2022 | Ginis et al. |
| 2023/0138084 A1 | 5/2023 | Kourous-Harrigan et al. |

FOREIGN PATENT DOCUMENTS

| | | | |
|---|---|---|---|
| CA | 3122688 A1 | 6/2020 | |
| CN | 101662778 A | 3/2010 | |
| EP | 3821632 A1 | 5/2021 | |
| EP | 3868142 A1 | 8/2021 | |
| EP | 3895465 A1 | 10/2021 | |
| KR | 1020070014270 A | 2/2007 | |
| WO | 9933298 A1 | 7/1999 | |
| WO | 2011130914 A1 | 10/2011 | |
| WO | WO-2016086669 A1 * | 6/2016 | ............ H04W 16/18 |
| WO | 2017135878 A1 | 8/2017 | |
| WO | 2020014000 A1 | 1/2020 | |
| WO | 2020081302 A1 | 4/2020 | |
| WO | 2020123208 A1 | 6/2020 | |

OTHER PUBLICATIONS

International Search Report and Written Opinion for International Patent Application No. PCT/US2019/055261, mailed Jan. 31, 2020, 10 pages.

"en.wikipedia.org/wiki/Fresnel_zone," (accessed Jun. 27, 2019), 5 pages.

"trac.osgeo.org/grass/browser/grass/trunk/raster/r.viewshed," (2018), 1 page.

Bartie, P., "Advances in Visibility Modelling in Urban Environments to support Location Based Services," University of Canterbury Christchurch, New Zealand, 2011 (retrieved on Sep. 3, 2019), Retrieved from the Internet https://pdfs.semanticscholar.org/0f31/259d76a2bb60865a8926840df89c78949d6e.pdf, 217 pages.

Chao, F., et al., "Parallel algorithm for viewshed analysis on a modern GPU," International Journal of Digital Earth, vol. 4, Issue 6 (2011), pp. 471-486.

Extended European Search Report for European Patent Application No. 19834059, mailed Mar. 17, 2022, 5 pages.

Extended European Search Report for European Patent Application No. 19873184.6, mailed Jun. 15, 2022, 9 pages.

Extended European Search Report for European Patent Application No. 19895757.3, mailed Mar. 17, 2022, 5 pages.

Heilmair, Christoph, "GPU-based visualisation of viewshed from road or areas in a 3D environment," Master of Science Thesis in Electrical Engineering, Linköping University, Sweden, 2016, LiTH-ISY-EX--16/4951-SE (2016), 71 pages.

International Preliminary Report on Patentability for International Patent Application No. PCT/US19/064322, mailed Jun. 24, 2021, 7 pages.

International Search Report and Written Opinion for International Patent Application No. PCT/US19/64322, mailed Apr. 6, 2020, 10 pages.

International Search Report and Written Opinion for International Patent Application No. PCT/US2019/039617, mailed Oct. 18, 2019, 12 pages.

Toma, L., et al, "r.viewshed algorithm described at grass.osgeo.org\\grass74\\manuals\\r.viewshed.html," (2018), 5 pages.

Non-Final Office Action for U.S. Appl. No. 17/311,654, mailed Jun. 13, 2023, 15 pages.

International Preliminary Report on Patentability for International Patent Application No. PCT/US2019/055261, mailed Apr. 29, 2021, 7 pages.

Advisory Action for U.S. Appl. No. 17/311,654, mailed Nov. 17, 2023, 4 pages.

Asset by Teoco: www.teoco.com/products/planning-optimization/asset-radio-planning (retrieved Jan. 19, 2022).

Atoll by Forst: http://www.forsk.com/atoll-overview (retrieved Jan. 19, 2022).

Notice of Allowance for U.S. Appl. No. 17/258,735, mailed Dec. 13, 2023, 7 pages.

people.math.gatech.edu/~thomas/FC/fourcolor.html (retrieved Jan. 19, 2022).

Final Office Action for U.S. Appl. No. 17/311,654, mailed Sep. 26, 2023, 17 pages.

Non-Final Office Action for U.S. Appl. No. 17/258,735, mailed Aug. 3, 2023, 11 pages.

Non-Final Office Action for U.S. Appl. No. 17/311,654, mailed Jan. 19, 2024, 19 pages.

\* cited by examiner

METHOD AND APPARATUS FOR EVALUATING A RADIO FREQUENCY FOR USE IN A CELL-AREA OF A WIRELESS NETWORK

CROSS-REFERENCE TO RELATED APPLICATIONS

This Application claims the benefit of U.S. provisional patent application No. 62/746,417 filed Oct. 16, 2018, entitled "Method and Apparatus for Evaluating a Radio Frequency for use in a Cell-Area of a Wireless Network.".

TECHNICAL FIELD

The present invention relates to the field of wireless internet access, and in particular to allocating a radio frequency for use between client devices and a base-station in a cell-area of a wireless network.

BACKGROUND

Wireless Internet Access

Internet access is increasingly being delivered wirelessly. Mobile wireless internet access is directly delivered to mobile devices, such as smartphones, tablets and laptops. Fixed wireless internet access is delivered to residences and businesses via customer-side wireless equipment installed at fixed locations.

It is common for wireless internet access to use a cellular network architecture. In such an architecture, the total service area is divided into land areas called cells. Each cell is served by one base transceiver station or base-station. (In certain architectures, a cell can be served by multiple base-stations.) Base-stations communicate in both the downlink (from base-station to customer-side devices) and the uplink (from customer-side devices to base-station) directions with the customer-side devices. Base-stations also have backhaul connections to the core network that further connects to the internet.

For mobile wireless internet access, base-stations are part of the infrastructure of the mobile network operator. In the Universal Mobile Telecommunications System (UMTS, also known as 3G), a mobile cellular system for networks based on the GSM standard, and the 3GPP Long Term Evolution (LTE, also known as 4G) mobile communications standard, the base-station is known as the Node B and eNodeB correspondingly, and the mobile device is known as the user equipment (UE). For fixed wireless internet access, base-stations are part of the infrastructure of the wireless internet service provider (WISP). The base-station may also be called an Access Point, a Point-to-MultiPoint (PtMP) radio, or a Base Unit (BU). The customer-side device may be called a Station, a client radio, or a Terminal Unit (TU). Also, for fixed wireless internet access, the term Access Point coverage area may be used instead of the term cell.

Multiple Access and Duplexing

In cellular networks, multiple customer-side devices in a cell must communicate in both directions with the base-station serving that cell. Such (wireless) communication uses the shared air medium. Communication theory defines the channel from the transmitting base-station to the receiving customer-side devices as the broadcast channel. The channel from the transmitting customer-side devices to the receiving base-station is defined as the multiple-access channel.

Multiple-access techniques enable multiple customer-side devices to communicate with a base-station. Such techniques apply to downlink communication (corresponding to the broadcast channel) or to uplink communication (corresponding to the multiple-access channel). They can be categorized as:
- random-access techniques;
- controlled-access techniques; and
- channelization techniques.

Random-access techniques require no prior coordination among devices for transmission to start. Examples include ALOHA, slotted ALOHA, Carrier Sense Multiple Access (CSMA), and Carrier Sense Multiple Access with Collision Detection (CSMA/CD).

Controlled-access techniques require coordination among devices before transmission starts. Examples include reservation protocols, polling protocols, and token-passing protocols.

Channelization techniques assign dedicated channels to each of the devices. The available bandwidth is divided by frequency (Frequency Division Multiple Access (FDMA); or Orthogonal Frequency Divisional Multiple Access (OFDMA)), by time (Time Division Multiple Access (TDMA)), or by code (Code Division Multiple Access (CDMA)).

In cellular networks, it is common for downlink communication to be separated from uplink communication using a duplexing technique. Frequency Division Duplexing (FDD) uses different frequencies in each direction, and Time Division Duplexing (TDD) uses different time slots in each direction to separate the downlink (or forward) from the uplink (or reverse) channels. It is possible to eliminate duplexing with the use of echo cancellation techniques at the receivers.

Cellular System Design

Cellular systems exploit the fact that wireless signals attenuate as they propagate in space. As a result, the same signal frequency (or time slot, or code) can be reused at sufficiently distant locations. In cellular system designs, each cell is assigned its own set of frequencies (or time slots, or codes). Cells with sufficient distance between them can reuse the same frequencies (or time slots, or codes).

Theoretical models of cellular systems assume that cells are non-overlapping hexagons with the base-station located at the center of each hexagon. The example of FIG. 1 [source: en.wikipedia.org/wiki/Cellular_network] shows how frequencies F1, F2, and F3 are reused among a set of cells 100-135. In this figure, there are three cells, 100, 110, and 130 that use the same frequency F1. The amount of inter-cell interference among these cells depends on the distance between them. A goal of system design is to keep such inter-cell interference sufficiently low.

Certain cellular systems use sectoring, where each cell is further divided into a number of sectors (e.g., 3 or 6). A single base-station still serves all of the cell's sectors; however, directional antennas narrow transmission and reception to the corresponding sector.

A second example of a cellular system is shown in FIG. 2 [source: www.pitt.edu/~dtipper/2720/2720 Slides4.pdf]. In this system, cells are grouped in clusters of size 7, and each cell within a cluster is assigned a unique frequency. Frequencies are reused within clusters of 7 cells, so the design is said to have a frequency reuse factor of 7. Cells using the same frequency are spaced far apart to mitigate effects of inter-cell interference. For example, the cell 205 at the center of the cluster of cells 200 is assigned frequency "5". There are 6 cells 210, 215, 220, 225, 230, and 235 (from the 6 clusters surrounding the cluster 200) also assigned frequency "5" and potentially introducing inter-cell interference.

Sectoring can further reduce inter-cell interference. If a different frequency is used for each sector, then inter-cell interference is introduced by only a subset of sectors. In FIG. 2, it is assumed that 120-degree sectoring is used (e.g., 120-degree sectors 240, 245 and 250), so that each cell is sub-divided into 3 sectors. The figure shows how sectoring reduces the number of neighboring cells that can potentially introduce inter-cell interference from 6 to 2.

In practice, cells are not hexagons. Terrain, vegetation and buildings affect signal propagation, which determines both the coverage provided by a base-station, and the interference caused to neighboring cells. The shapes of cells depend on these factors; these shapes may be non-symmetric around the base-station, they may contain "holes", and they may even consist of "islands", i.e., pieces that are disconnected. Furthermore, interference encountered in a cell that is caused by "neighboring" cells is not necessarily limited to cells that are adjacent to the cell. There is a potential for, a possibility of, interference being encountered in a cell that is caused by a cell that is nonadjacent, or non-contiguous with respect, to the cell.

Interference in a Cellular System

Given the preceding description, sources of interference in a cellular system can be categorized, and the common techniques to prevent such interference can be described. FIG. 3 shows an example of a cellular system 300 consisting of two base-stations, B1 and B2. User equipment (UE), or "Client", devices C11, C12 and C13 belong to the cell of B1, and communicate in both the downlink and the uplink direction with B1. Clients C21, C22, and C23 belong to the cell of B2, and correspondingly communicate in both directions with B2.

The following types of interference can affect downlink communication (e.g. from B1 to C11):

Intra-cell (also known as in-cell) interference: transmissions from clients, e.g., clients C12 and C13, which belong to the same cell as C11, may cause interference onto the signal received by another client in the same cell, e.g., C11. Such interference is typically mitigated using the multiple-access techniques described above.

Inter-cell (also known as out-of-cell) interference: transmissions from clients in one cell area, e.g., clients C21, C22 and C23, and also from the base-station B2 in the same cell area, may cause interference onto the signal received by clients in a different, neighboring cell area, e.g., clients C11 (or C12 or C13). Such interference is typically prevented by assigning a different frequency (or time slot or code) to neighboring cells as described above.

Self-interference: transmissions from a client, e.g., client C11, itself may cause interference onto the signal received by C11 itself. Such interference, which is also known as echo, is typically avoided using the duplexing techniques described above, or with echo cancellation.

The same types of interference can affect uplink communication from a client in one cell area to a base station in the same cell area, e.g., from C11 to B1. These types of interferences are here only briefly listed:

Intra-cell (or in-cell) interference, e.g., from C12 and C13.

Inter-cell (also known as out-of-cell) interference, e.g., from C21, C22 and C23, and from B2.

Self-interference: From base-station B1 itself.

An example scheme to reduce intra-cell, inter-cell and self-interference is described next based on the Spectrum Reuse Synchronization (SRS) technique used by Mimosa radio products operating in the 5 GHz band, available from Airspan Networks Inc.

In SRS, a base-station (or access-point) is using the same frequency for both downlink and uplink transmission. The multiple access technique is TDMA: A time window is split into slots, where a fixed percentage of time-slots is allocated to downlink and the remaining time-slots are allocated to uplink. The base-station uses downlink time-slots to transmit data destined for different clients. The base-station also allocates uplink time-slots to clients and informs them of this allocation. Clients only transmit during their allocated time-slots. This scheme eliminates intra-cell interference (only one among the base-station and the clients can transmit at any time), and self-interference (there can be no simultaneous downlink and uplink transmission at any given time).

Additionally, in SRS, all base-stations are synchronized to the Global Positioning System (GPS) clock, and synchronize their time windows, such that their downlink and uplink time-slots are aligned. Thus, reception of a signal at a base-station is not affected by interference from a neighboring base-station (e.g., B1 in FIG. 3 cannot receive interference from B2). Similarly, reception of a signal at a client is not affected by interference from a client in a neighboring cell (e.g., C11 cannot receive interference from C21, C22 or C23). This eliminates one type of inter-cell interference.

SRS does not eliminate the following type of inter-cell interference: reception of a signal at a base-station may be affected by interference from clients in neighboring cells (e.g., B1 may receive interference from C22). And reception of a signal at a client may be affected by interference from a neighboring base-station (e.g., C11 may receive interference from B2). This effect is mitigated by the fact that clients are using directional antennas. As further discussed herein below with reference to FIG. 15, for such interference to have an impact, base-stations and clients have to be approximately co-linear (e.g., in FIG. 3, the line formed by B2 and C22 needs to approximately align with the line formed by B1 and C22; or the line formed by C11 and B1 needs to approximately align with the line formed by C11 and B2).

Trends

Demands for higher wireless speeds, lower latency and higher density of connected devices are leading to two fundamental changes in the design of cellular systems:

A. Wireless systems must use larger amounts of radio frequency spectrum.

B. Wireless base-stations must be located closer to the user equipment, or customer device.

Wireless internet access is increasingly using "mid-band" (3 to 6 GHz) or "high-band" (greater than 6 GHz) spectrum in either licensed or in unlicensed bands. 5G wireless systems are expected to additionally use higher frequencies, such as microwave frequencies above 3 GHz, and millimeter-wave (mmwave) frequencies (starting at 30 GHz). Wireless Internet Service Providers (WISPs) have traditionally used the 915 MHz, 2.4 GHz, and 5 GHz bands for their Access Points, but are expanding their use of the 24 GHz and 60 GHz bands.

The use of higher frequencies leads to larger attenuation of the radio signals for a given distance. This, combined with the needs for higher throughput, lower latency and higher connection density, requires shorter distances between base-stations and customer devices, and consequently requires more base-stations in each served area. For existing 4G wireless systems that use a cellular system architecture, the transition to 5G involves the addition of small cells with a smaller footprint than traditional macro-cells. This process of adding small cells to supplement existing macro-cells is known as densification. Similarly for WISPs, the use of higher frequencies requires denser networks of Access Points.

Additionally, the use of higher frequencies means that radio signals propagate mainly via line-of-sight (LOS) paths. Building walls and foliage mostly block radio signals operating at these higher frequencies. The presence of structures and vegetation can affect the area that can be reliably served by the base-station. The cell area is effectively equal to the viewshed of the base-station's antenna (i.e., the area visible from that antenna). Consequently, the resulting cell areas (or Access Point coverage areas) can be highly fragmented, especially if base-station antennas cannot be installed on very tall towers, but have to be mounted on structures, such as existing buildings, and utility or street-lighting poles.

An example 400 of such a fragmented cell area is shown in FIG. 4. The example assumes that the base-station's antenna is located at 410 as "Cereus Ct". The areas 405 (super-imposed on a map from a suburban neighborhood) represent the antenna viewshed, and therefore also approximate very closely the cell area (or the Access Point coverage area) within the boundaries of the map. The main observation here is that the cell area consists of a very large number of fragments ("islands" 405). If frequencies below 3 GHz were instead used, the area would be much more contiguous.

Statement of the Problem

Frequency Allocation

In a cellular system where each cell is assigned its own set of frequencies, the allocation of these frequencies is a very important design decision. The frequency allocation must take into account cell-areas and ensure that inter-cell interference is avoided. The allocation must also be such that the set of required frequencies is minimized. In other words, a low frequency reuse factor is desired, which translates into a more efficient use of the available spectrum.

The frequency allocation problem becomes even more complex with the use of higher frequencies, where the cell-area is well approximated by the viewshed of the base-station's antennas. In contrast to cell-area models for operation at lower frequencies, cell-areas for operation at higher frequencies can be very fragmented.

The frequency allocation problem can be posed as the question of selecting a frequency for a base-station, given the frequencies used by other neighboring base-stations. Alternatively, it can be posed as the question of selecting frequencies for a group of base-stations in an area or region.

In the above problem statement, and in the claims that follow, "frequency" (i.e., radio frequency) colloquially refers to a center frequency to be chosen among a set of available frequencies. As is commonly known, actual communication takes place over a range of frequencies, occupying a certain "bandwidth" below and above the center frequency.

Prior Art

Frequency Allocation for Cellular Systems

As explained earlier, theoretical models of cellular systems assume that cell-areas are non-overlapping hexagons. The cells form clusters each containing a number of cells equal to the frequency reuse factor. The available spectrum is divided by the frequency reuse factor, and the resulting frequencies are assigned to the cells of the cluster, for example using the allocation scheme shown in FIG. 2. Although actual cell-areas are not hexagons, this allocation scheme can also be used in a practical cellular system at the very least as a starting point before applying further optimization.

Frequency allocation for cellular systems using lower frequencies (e.g., lower than 3 GHz) may further use appropriate radio propagation models to produce estimates of signal strength at different points on a map given the assumed location of a base-station. Such models can be as simple as assuming that radio signal power falls with distance at a rate that is inversely proportional to a power of the distance. This power value may be selected as low as 2 (corresponding to theoretical free-space radio propagation) or have larger values such as 4 or 6 (which can more accurately approximate actual signal propagation effects in a rich scattering environment, e.g., inside buildings, or through dense foliage). More sophisticated models can make use of terrain data, where such terrain data represent the terrain elevation for each point on a map (typically relative to sea-level). The advantage of using terrain data is that the effect of natural features (e.g., hills, valleys) on radio propagation can be taken into account to produce more accurate estimates of signal strength. Still other models may apply ray-tracing techniques, where radio propagation is modeled as rays reflected off objects or surfaces included in the model.

The ability to estimate signal strength allows the designer to estimate both desired signal strength and interference strength at different points on a map for the given locations of a base-station and of the base station's potentially or possibly interfering neighboring base-stations operating at the same frequency. Given such knowledge, signal to interference ratios (SIR), or signal to interference plus noise ratios (SINR) can be produced (for downlink or uplink or for both directions). At a given point on a map, the SIR (or SINR) then determines whether a communication link is possible between a base-station and a client, and also determines the data rate at which such communication can take place. This in effect defines the cell-area of the base-station, with points of sufficient SIR/SINR assigned inside the cell-area, and points of poor SIR/SINR assigned outside the cell-area.

The designer is then able to optimize the allocation of frequencies to base-stations. The effect of changing the frequency of one base-station can be analyzed to understand how that changes its own cell-area and the cell-areas of neighboring base-stations. The frequency of such a base-station can thus be optimized based on criteria such as maximizing its own cell-area, or minimizing impact on cell-areas of neighboring base-stations.

A number of cellular system design tools are described in the following references:
    ASSET by TEOCO: www.teoco.com/products/planning-optimization/asset-radio-planning
    ATOLL by Forst: www.forsk.com/atoll-overview
    Planet by Infovista: www.infovista.com/products/planet-network-planning-solutions
    loudRF: cloudrf.com Frequency Allocation for Fixed Wireless Systems Networks for fixed wireless interne delivery may use different criteria for frequency allocation than those in cellular systems. In cellular systems, the client devices are mobile and the systems have "hand-off" capabilities, which allow a client to switch from connecting to a first base-station to connecting to a second base-station. Such switching is performed, when it is determined that the connection to the second base-station is better than the connection to the first base-station. In fixed wireless systems, the client devices are fixed and use directional antennas pointed to the base-station. Switching a client from one base-station to another requires, in most cases, a technician. Thus, in fixed wireless systems, frequency allocation is further constrained by the requirement to not disrupt the connections of existing clients as might be caused by increasing inter-cell interference affecting them.

Frequency Allocation Using "Color-Mapping"

Yet another approach to frequency allocation for wireless systems is the following: first, estimate cell-areas using any of the previously mentioned techniques, and apply the simplification of making neighboring cell-areas adjacent with no gaps. Then, treat the frequency allocation problem as the problem of choosing colors on a map of countries (known as the "color-mapping problem")—see the example in FIG. 5 (from people.math.gatech.edu/~thomas/FC/fourcolor.html). A well-known mathematical result states that 4 colors are sufficient to draw such a map with no two neighboring countries assigned the same color. In FIG. 5, the four colors are respectively represented by different shadings at 505, 510, 515 and 520. For the frequency allocation problem, the solution to the color-mapping problem translates into adjacent cell-areas ("countries") having different frequencies ("colors"). A total of only four frequencies need to be assigned. A limitation of this solution is that it eliminates intra-cell interference only from adjacent cells, but not from non-adjacent cells.

DETAILED DESCRIPTION

Frequency Allocation

The embodiments of the invention described herein make use of detailed mapping data to accurately model the effects of radio signal propagation at mid-band and high-band frequencies. Prior art approaches relied at best on Digital Terrain Model (DTM) data, which do not include objects such as buildings and vegetation. The methods described herein primarily use Digital Surface Model (DSM) data, which take into account buildings and vegetation (above the terrain). DSM (and also DTM) data are typically stored as elevation values (relative to sea or another reference level) for an orthogonal grid of points.

Additionally, embodiments of the invention make use of parcel or property data to precisely quantify the effects of frequency selection on existing or potential customers.

Such data represent property boundaries as polygons defined by their corner points. Parcel data may include associated data such as addresses, land-use information, zoning information, data about the building or buildings on the parcel, tax information and other. In the State of California in the USA, parcel data are maintained by each county and are used for purposes of assessing property taxes.

Evaluation of Given Frequency Allocation for Downlink Communication

Evaluating a given frequency allocation can be done individually for the downlink and the uplink communication paths. The objective of such evaluation is to produce a flag or a metric or a set of metrics characterizing the given frequency allocation for downlink or uplink communication within a given cell-area.

Figure 11:
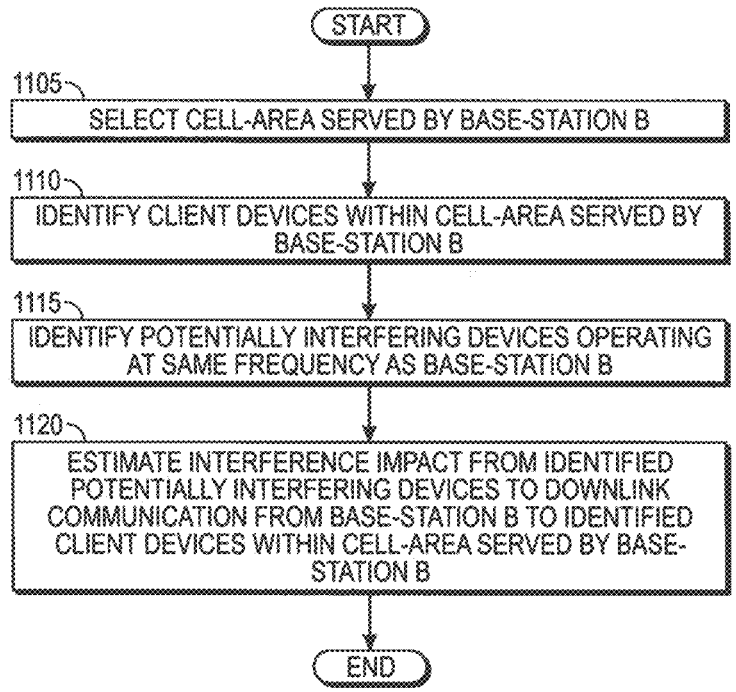
FIG. 11 is a flow chart illustrating an embodiment of the invention.

For a given frequency allocation, the evaluation steps for downlink communication are as follows, with reference to FIG. 11:

1. Select, at step 1105, a cell-area served by base-station B;
2. Identify, at step 1110, client devices C_1, C_2, . . . , C_N within the cell-area served by base-station B;
3. Identify, at step 1115, potentially or possibly interfering devices I_1, I_2, . . . , I_M operating at the same frequency as base-station B; and
4. Estimate, at step 1120, the interference impact from I_1, I_2, . . . , I_M to downlink communication from B to each of C_1, C_2, . . . , C_N.

Figure 1:
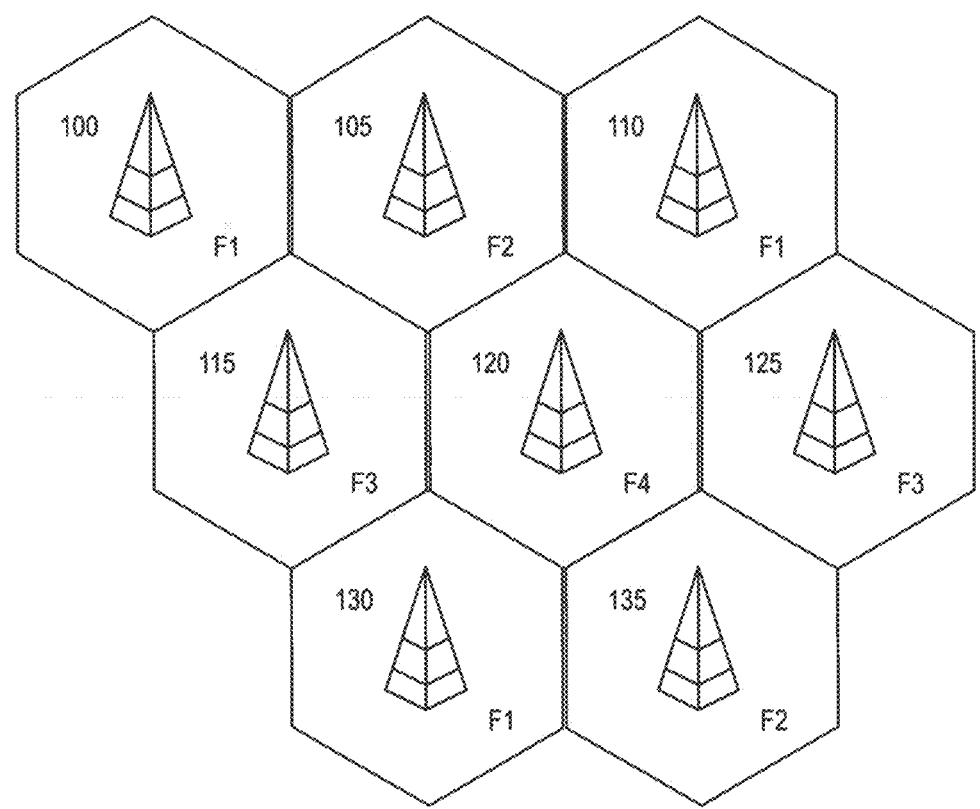
FIG. 1 is a depiction of how frequencies are reused among a set of cells in a cellular system.
Figure 2:
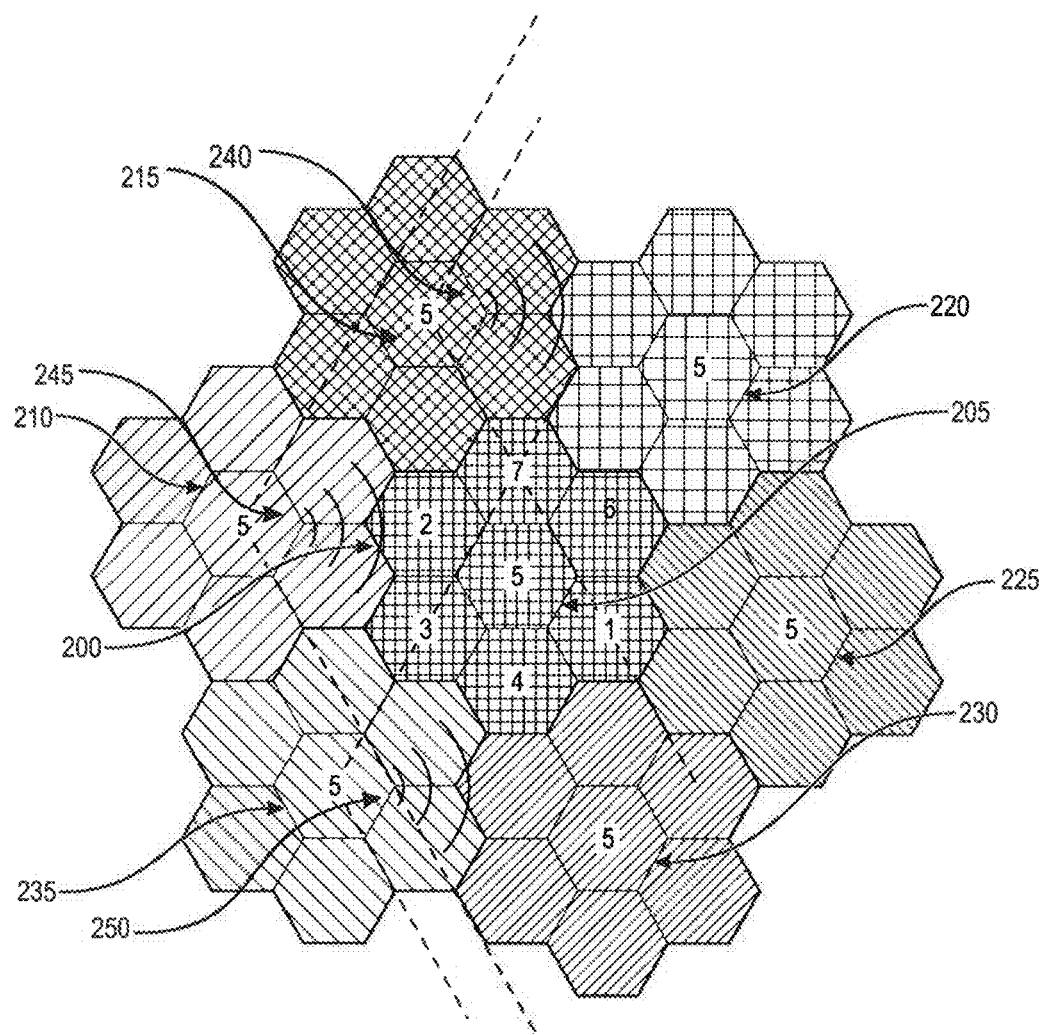
FIG. 2 is a depiction of another example of a cellular system using 120-degree sectoring.
Figure 3:
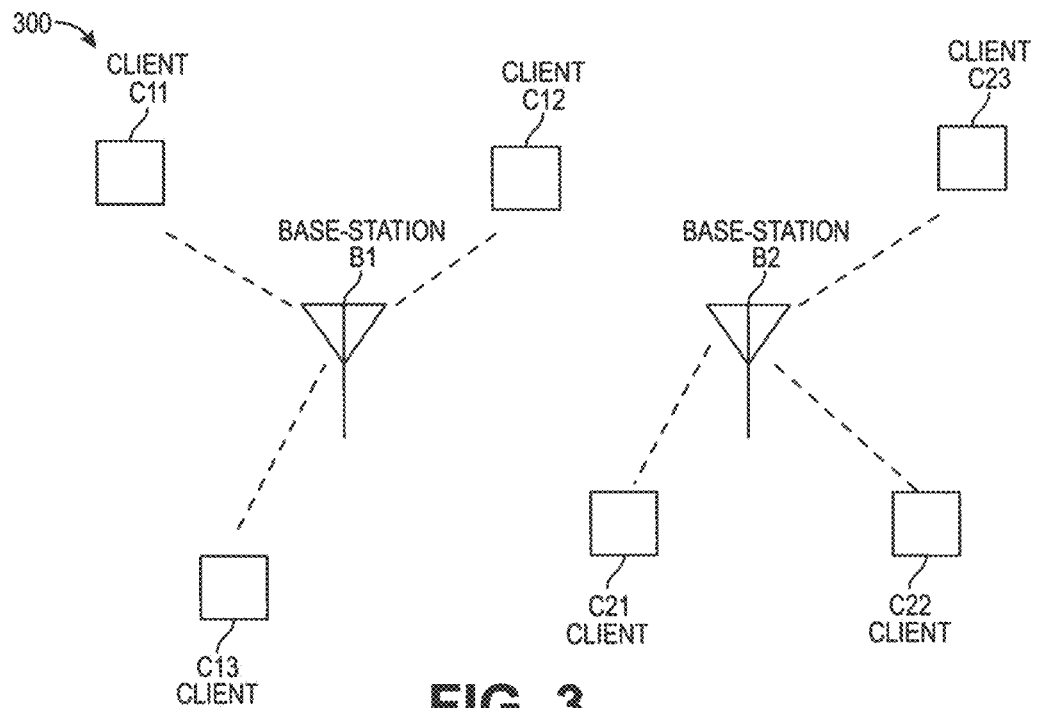
FIG. 3 depicts a cellular system with two base-stations.
Figure 4:
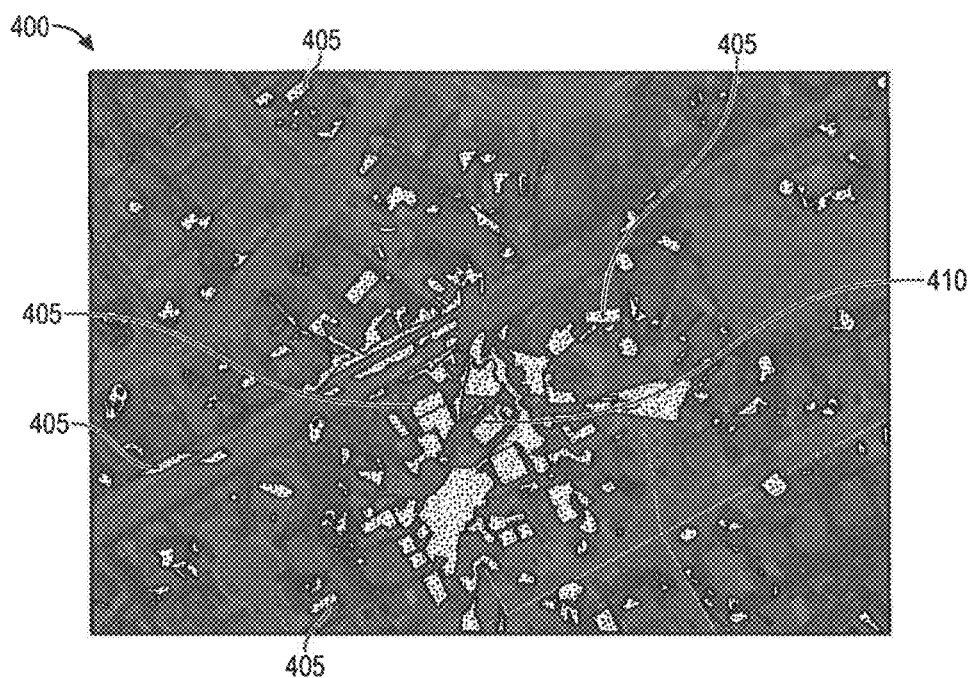
FIG. 4 depicts an example of a fragmented cell area in a cellular system.
Figure 5:
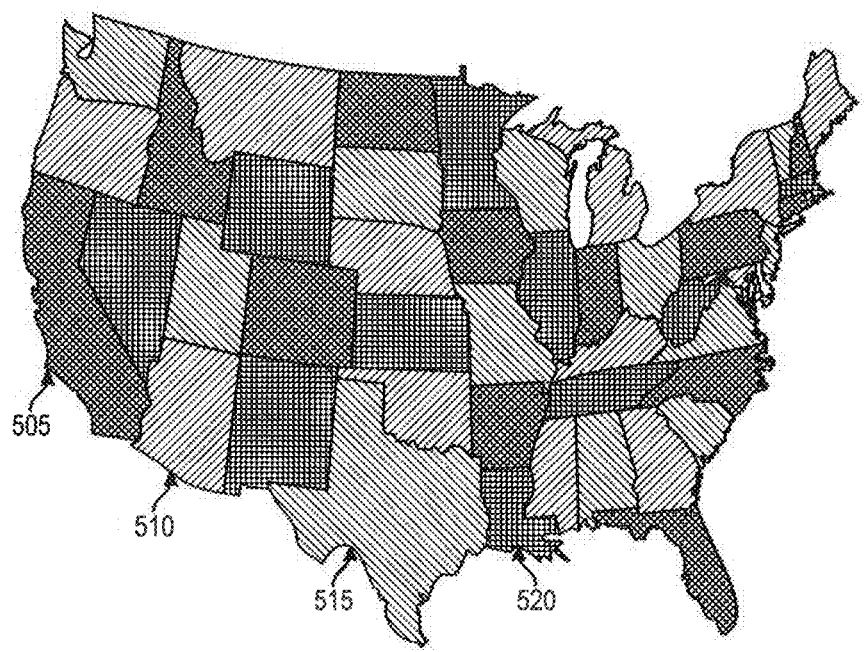
FIG. 5 depicts an example of color-mapping as an approach to frequency allocation for a cellular wireless system.
Figure 6:
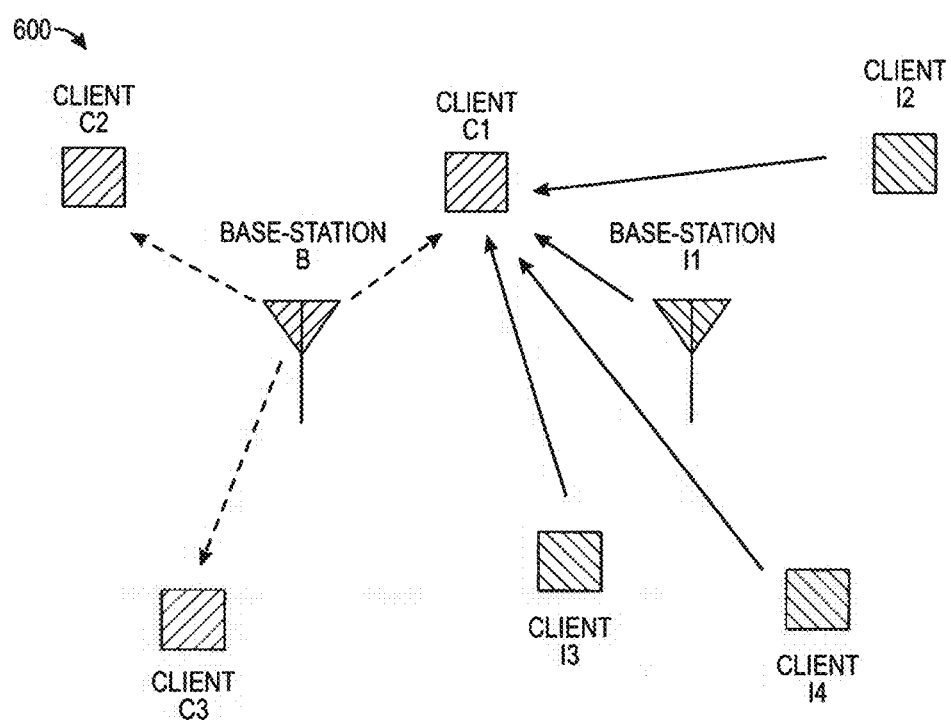
FIG. 6 depicts evaluation of frequency allocation for a downlink in a cellular system in accordance with an embodiment of the invention.

Further explanation of these steps refers to FIG. 6 as an example embodiment 600.

Selecting a Cell-Area 1105

The cell-area that is under evaluation is selected in the first step at 1105. That cell-area may be one where an existing base-station is already serving client devices, or it may be a planned one where the base-station is not yet constructed, where the base-station is not yet serving any customers, or where the base-station may be serving some customers and the plan is for the base-station to serve yet further customers.

Identifying Client Devices 1110

In the second step, at 1110, the client devices served by the selected base-station are identified. In FIG. 6, these are client devices C_1, C_2 and C_3 and are served from the base-station B. There are several options for performing such identification:

Client devices can be identified as existing client devices currently served from base-station B; or Client devices can be identified as potential client devices expected to be served in the future from base-station B.

In the former case, the location of the client devices is exactly known. In the latter case, the location of the client devices has to be determined. One approach is to choose a number of points (i.e., locations) within the viewshed of the antenna of base-station B. Such points may correspond to centroids of parcels, or may correspond to points on roofs within parcels that would be suitable for mounting antenna gear. The points may be chosen randomly among the parcels within the base-station viewshed, or they may be chosen using previous sign-up information from customers that have expressed interest in the service. According to one embodiment, the points can be identified to include all parcels within the base-station's viewshed.

Identifying Potentially Interfering Devices 1115

In the next step, at 1115, the potentially interfering devices I_1, I_2, ..., I_M are identified. These are devices located in neighboring cell-areas that are operating at the same frequency as base-station B, and thus have the potential to cause interference onto C_1, C_2, ..., C_N. Such devices may be located in multiple neighboring cell-areas. Such devices can include base-stations and also client devices. If a scheme like Mimosa's SRS is used, then only base-stations are included. (SRS applies GPS synchronization to all base-stations and uses TDD to thus prevent client devices from causing inter-cell interference.) If client devices are included in the list of potentially interfering devices, they may be chosen using similar techniques as those discussed in the previous paragraph: they can be identified as existing client devices; or they can be identified as potential client devices expected to be installed in the future.

Estimating Interference Impact 1120

The next step, at 1120, is the estimation of the interference impact from I_1, I_2, ..., I_M. This estimation is performed for each of C_1, C_2, ..., C_N to obtain a measure of the impact on downlink communication from B to C_1, C_2, ..., C_N. For a given C_i, the interference from transmissions of I_1, I_2, ..., I_M is estimated at the location of C_i. (See, for example, FIG. 6 showing solid line arrows to represent interference from transmissions of I_1, I_2, I_3 and I_4 onto C_1.)

Figure 7:
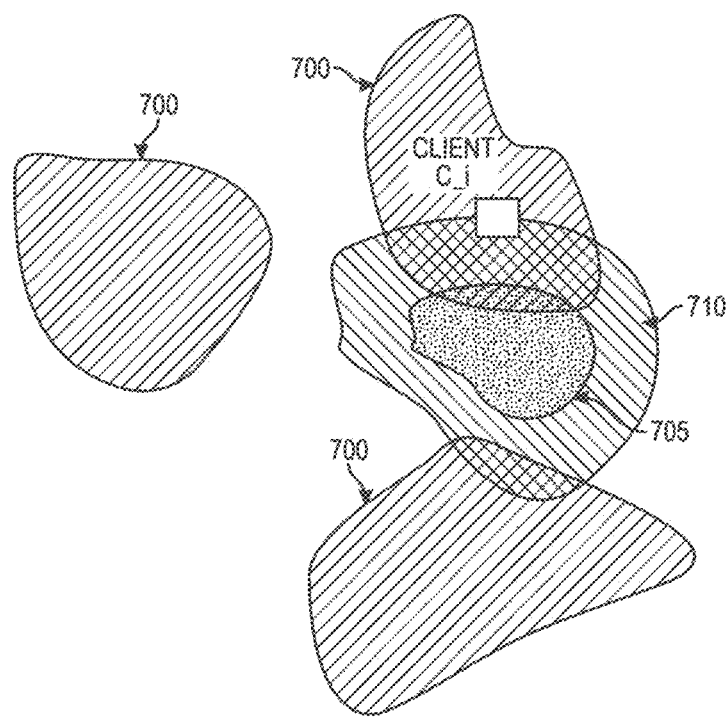
FIG. 7 depicts a cell-area and interferer area with an affected client device in accordance with an embodiment of the invention.

The estimation of interference from I_j to C_i is greatly improved by taking into account mapping data. In the example of FIG. 7, the cell-area (closely approximated by the viewshed, according to one embodiment) of base-station B is shown as "islands" 700. Client device C_i is also shown as located inside one of the islands. In order to estimate the interference from device I_j to C_i, the viewshed of device I_j is first obtained (depicted as area 705 in FIG. 7). This viewshed area 705 may be expanded by a "buffer" zone shown at 710 in the example of FIG. 7 to produce an expanded interference area of I_j. At its simplest, this buffer zone 710 can be a geometric enlargement of the viewshed of I_j 705. More complex techniques may involve calculating this buffer zone by modeling how the interfering signal is affected by scattering, refraction, diffraction or absorption, and finding the boundary where this interfering signal falls below a threshold.

One approach to estimating interference impact from I_j to C_i, according to one embodiment, is to declare that such impact is significant when C_i falls within the viewshed 705, or the buffer zone (expanded interference area) 710, of I_j.

More sophisticated estimates of the interference from I_j to C_i are also possible, according to embodiments of the invention. Interference power can be estimated according to the location of C_i as follows:

If C_i is within the viewshed of the interferer I_i 705, then a free-space path-loss (FSPL) or similar formula can be used to obtain the interference power as a function of the distance between I_j and C_i;

If C_i is within the buffer zone of the viewshed of the interferer I_i 710, then an appropriate model can be used to derive the interference power. For example, the interference power can be estimated by combining the FSPL formula with a propagation model in the buffer zone; and If C_i is entirely outside the expanded interference area of I_i 710, the interferer power can be assumed to be equal to zero.

According to embodiments of the invention, estimating interference impact may involve producing a metric, e.g., total interference power, or SNR, characterizing communication from B to C_i. In one embodiment, the metric may be a binary value, e.g., "falls inside/outside viewshed" 700.

For a given C_i, and having estimated the individual impact from each interferer I_j, the cumulative impact from all interferers I_1, ..., I_M can then be found. For example, the interference power of individual interferers can be summed up to produce the total interference power.

A further possible step is to calculate the received signal power of the transmission from B to C_i. Knowing both the signal power at C_i and the sum of the interference power at C_i, the SIR or the SINR is then computed.

The above interference and signal power calculations can be made more accurate by properly accounting for power gains from directional antennas and beam forming. For those devices (among B, C_1, C_N, I_1, ..., I_M) with directional antennas, information (or assumptions) about the orientation of such antennas can be included in the calculations.

Assessing the Interference Impact

A variety of techniques can be applied to assess the interference impact for downlink communication from B to C_i. For example:

Compare the total interference power at C_i to a defined threshold, and rank the impact as acceptable or unacceptable;

Compare the SIR and/or SINR to a defined threshold, and rank the impact as acceptable or unacceptable; or Compare the SIR and/or SINR to a previously recorded or calculated value of SIR and/or SINR, and rank the impact as acceptable or unacceptable based on whether degradation or improvement is observed relative to the previous value.

Given a downlink impact assessment for each C_i, an aggregate impact assessment can be produced for all of C_1, C_N. Such an aggregated downlink assessment may take forms such as:

counting the number of client devices that show unacceptable impact for downlink; or counting the percentage of client devices that show acceptable impact for downlink; or counting the number of client devices corresponding to existing installations that show unacceptable impact for downlink.

In embodiments of the invention, assessing interference impact may involve taking the metric mentioned above in the step of estimating interference impact, and reducing it to a binary output (e.g., acceptable or unacceptable). Also, in one embodiment, an aggregate assessment for all C_i may be produced.

Evaluation of Given Frequency Allocation for Uplink Communication

Figure 12:
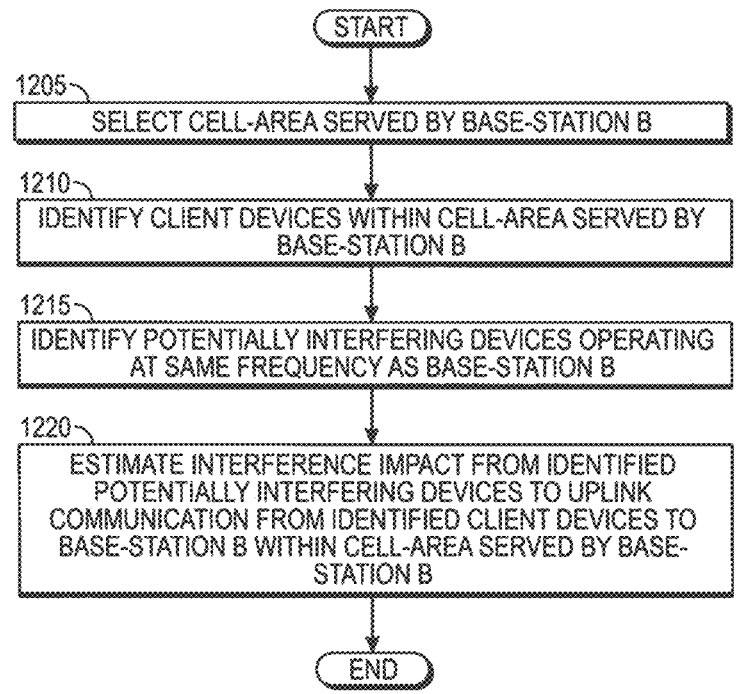
FIG. 12 is a flow chart illustrating an embodiment of the invention.

The above embodiments can also be applied to uplink communication. For a given frequency allocation, the evaluation steps for uplink communication are as follows, with reference to FIG. 12:

1. Select, at step 1205, a cell-area served by base-station B;
2. Identify, at step 1210, client devices C_1, C_2, . . . , C_N within the cell-area served by base-station B;
3. Identify, at step 1215, potentially interfering devices I_1, I_2, . . . , I_M operating at the same frequency as base-station B; and
4. Estimate, at step 1220, interference impact from I_1, I_2, . . . , I_M to uplink communication from each of C_1, C_2, . . . , C_N to B.

Figure 8:
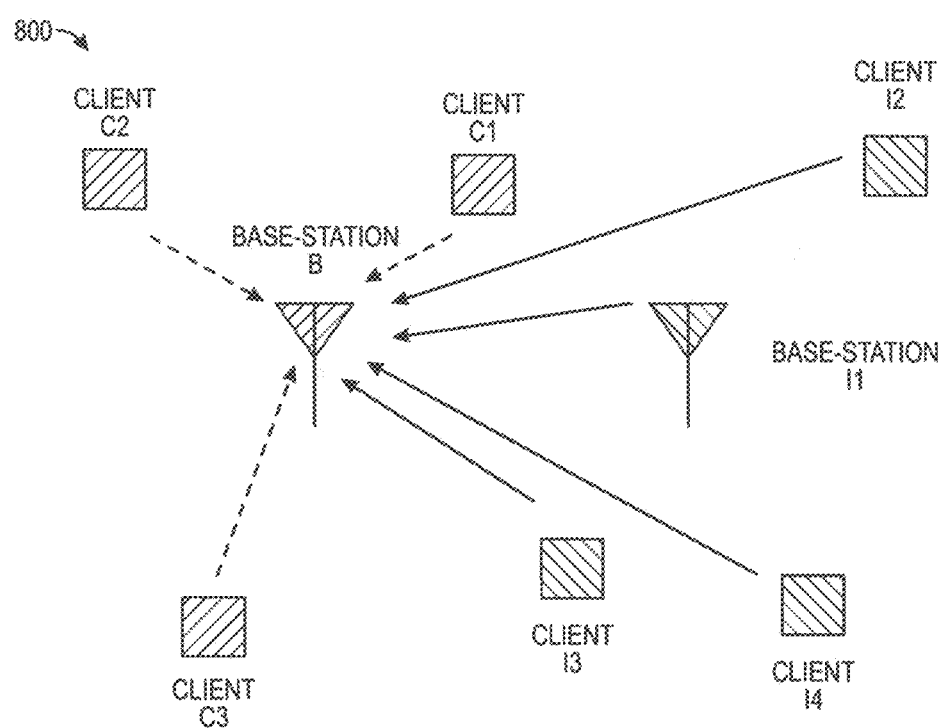
FIG. 8 depicts evaluation of frequency allocation for an uplink in a cellular system in accordance with an embodiment of the invention.

Further explanation of these steps uses FIG. 8 as an example embodiment 800. The steps of selecting a cell-area at 1205 and identifying client devices at 1210 are similar to the downlink case described above. Identifying potentially interfering devices at 1215 is also similar to the downlink case. If an inter-cell interference mitigation scheme like Mimosa's SRS is in use, then potentially interfering devices only include client devices and no base-stations.

Estimating Interference Impact 1220

The estimation of the interference impact from I_1, I_2, . . . , I_M can be done either generally for the effect on the base-station B, or more specifically for the effect on communication from each of C_1, C_2, . . . , C_N to B, according to the embodiments.

If estimating the general impact on base-station B, the interference from transmissions of I_1, I_2, . . . , I_M can be estimated at the location of B. (See, for example, FIG. 8 showing solid line arrows to represent interference from transmissions of I_1, I_2, I_3 and I_4 onto B.)

Figure 9:
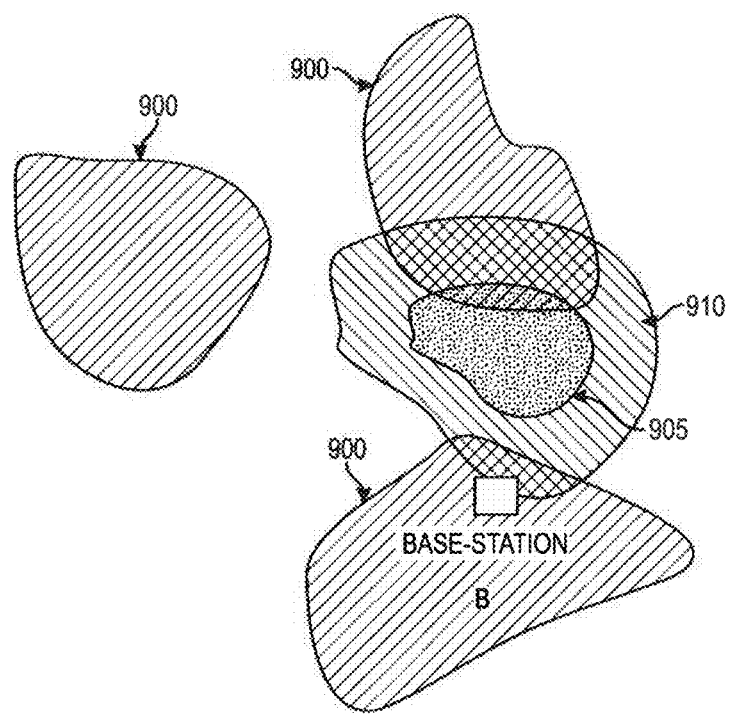
FIG. 9 illustrates a cell-area and interferer area with an affected base-station in accordance with an embodiment of the invention.

The estimation of interference from I_j to B is greatly improved by taking into account mapping data. In the example of FIG. 9, the cell-area (closely approximated by the viewshed) of base-station B is shown as 3 "islands" 900. As expected, the base-station B is located inside one of the islands. In order to estimate the interference from device I_j to B, the viewshed of device I_j is first obtained (see area 905 in FIG. 9). This viewshed area may be expanded by a "buffer" zone shown at 910 in the example of FIG. 9 to produce an expanded interference area of I_j. As explained previously for the downlink case, there are multiple methods for calculating this "buffer" zone.

One option for estimating the interference impact from I_j to B is to declare that such impact is significant when B falls within the buffer zone (expanded interference area) of I_j 910. As previously explained for the downlink case, more sophisticated estimates of the interference from I_j to B are also possible. Different models may be applied depending on whether B falls within the viewshed of the interferer I_i 905, or within the buffer zone of the viewshed of the interferer I_i 910, or entirely outside the expanded interference area 910. Finally, having estimated the individual impact from each interferer I_j, the cumulative impact from all interferers I_1, . . . , I_M can be found such as by summing up the interference power of individual interferers.

Alternatively, the interference impact from I_1, I_2, . . . , I_M can be estimated individually for the uplink communication links from each of C_1, C_2, . . . , C_N to B. This requires the estimation of received signal power of the transmission from C_i to B. Knowing both the signal power at B and the sum of the interference power at B, the SIR or the SINR is then computed for each of the uplink transmissions from C_1, C_2, . . . , C_N.

Assessing the Interference Impact

Various embodiments assess the interference impact for uplink communication. If only estimating the general impact on B, the total interference power at B can be compared to a defined threshold, and the impact can then be ranked as acceptable or unacceptable, according to one embodiment.

If estimating individually the interference impact for uplink communication from C_i to B, then the following techniques can be applied, according to embodiments:

Compare the SIR and/or SINR to a defined threshold, and rank the impact as acceptable or unacceptable.

Compare the SIR and/or SINR to a previously recorded or calculated value of SIR and/or SINR, and rank the impact as acceptable or unacceptable based on whether degradation or improvement is observed relative to the previous value.

Given an uplink impact assessment for each C_i, an aggregate impact assessment can be produced for all of C_1, . . . , C_N. Such an aggregated uplink assessment may take forms such as:

counting the number of client devices that show unacceptable impact for uplink;

counting the percentage of client devices that show acceptable impact for uplink; or counting the number of client devices corresponding to existing installations that show unacceptable impact for uplink.

Frequency Allocation Optimization

Given the previously described methodologies for evaluating a given frequency allocation for downlink or for uplink communication, the frequency allocation of a wireless system can be optimized, according to further embodiments of the invention, described below.

Find Frequency of New Cell-Area

In this embodiment, the frequency of a new cell-area is selected, and it is assumed that the frequencies of existing cell-areas are fixed. The frequency of the new cell-area is selected among a set of available frequencies. Availability of frequencies may depend on commercial factors such as spectrum licensing. Or it may depend on technical factors such as selecting frequencies/channels that have sufficiently low levels of background noise or interference. For example, there is a potential for, or possibility of, non-cellular devices, unlicensed devices, Internet of Things (IoT) devices, etc., in the selected cell area or a neighboring cell area operating at the same frequency. There is further a possibility of overlapping cellular network systems so that wireless devices physically located in the same cell area are operating in a different cell in the other cellular network system. These potentially interfering devices may be factors considered in selecting frequencies/channels that have sufficiently low levels of background noise or interference. In this embodiment, the new cell-area's frequency is such that it does not cause unacceptable degradation on devices of neighboring cell-areas. It is then desired that the new cell-area's frequency be such that interference impact within the new cell-area is minimized or is sufficiently low.

Figure 13:
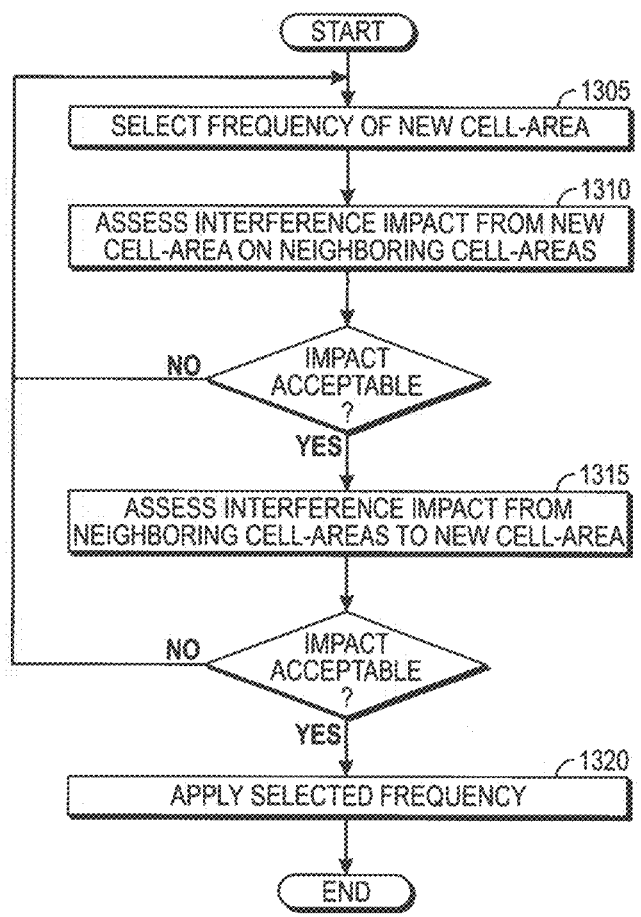
FIG. 13 is a flow chart illustrating an embodiment of the invention.

The steps of optimization according to this embodiment can be summarized as follows, with reference to the flow diagram in FIG. 13:

1. At step 1305, select a frequency of the new cell-area from a list of available frequencies;

2. At step 1310, assess the interference impact from the new cell-area on the neighboring cell-areas (using the same frequency);
3. If the impact is unacceptable, go to step 1305; otherwise, continue;
4. At step 1315, assess the interference impact from the neighboring cell-areas (using the same frequency) to the new cell-area;
5. If the impact is unacceptable, go to step 1305; otherwise, apply the selected frequency at step 1320.

Thus, one embodiment generally involves a method for applying a selected frequency at which to conduct communications between a base-station and a plurality of user equipment in a new cell-area in a wireless network, given established frequencies at which communications are conducted between base-stations and user equipment in existing, neighboring, cell-areas in the wireless network, the method comprising: selecting a frequency for the new cell-area; assessing an interference impact from the new cell-area to the neighboring cell-areas based on the selected frequency; assessing an interference impact from the neighboring cell-areas that are using the selected frequency to the new cell-area; and applying the selected frequency to conduct the communications between the base-station and the plurality of user equipment in a new cell-area in a wireless network when the interference impact is acceptable responsive to the above assessing steps.

A variation of the above optimization steps would be to iterate over all available frequencies, and choose the one frequency that minimizes the interference impact to the new cell-area, while keeping the impact acceptable for neighboring cell-areas. Further variations of these steps may take into account objectives such as re-using frequencies as much as possible, or may use as the optimization objective a weighted sum of impacts on the new cell-area and on the neighboring cell-areas.

Thus, one embodiment generally involves a method for applying one of a plurality of available frequencies at which to conduct communications between a base-station and a plurality of user equipment in a new cell-area in a wireless network, given a plurality of established frequencies at which communications are conducted between base-stations and user equipment in existing, neighboring, cell-areas in the wireless network, the method comprising: selecting each of the plurality of available frequencies for the new cell-area; assessing, for each selected available frequency, an interference impact from the new cell-area to the neighboring cell-areas based on each selected available frequency; assessing, for each selected available frequency, an interference impact from the neighboring cell-areas that are using the selected available frequency to the new cell-area; and applying the one of the selected available frequencies to conduct the communications between the base-station and the plurality of user equipment in the new cell-area that most minimizes the interference impact to the new cell-area and provides an acceptable interference impact on the neighboring cell-areas.

Assessment of interference impact may include assessment for either downlink or for uplink or a combined assessment for both transmission directions.

Change Frequency of Existing Cell-Area

In this embodiment, the frequency of an existing cell-area is changed, and is selected among a set of available frequencies. In this embodiment, the new frequency is such that it does not cause unacceptable degradation on existing client devices of either the neighboring cell-areas or of the existing cell-area whose frequency is changed. It is also desired that the new frequency of the existing cell-area be such that the interference impact on future client devices within this cell-area is minimized or is sufficiently low.

Figure 14:
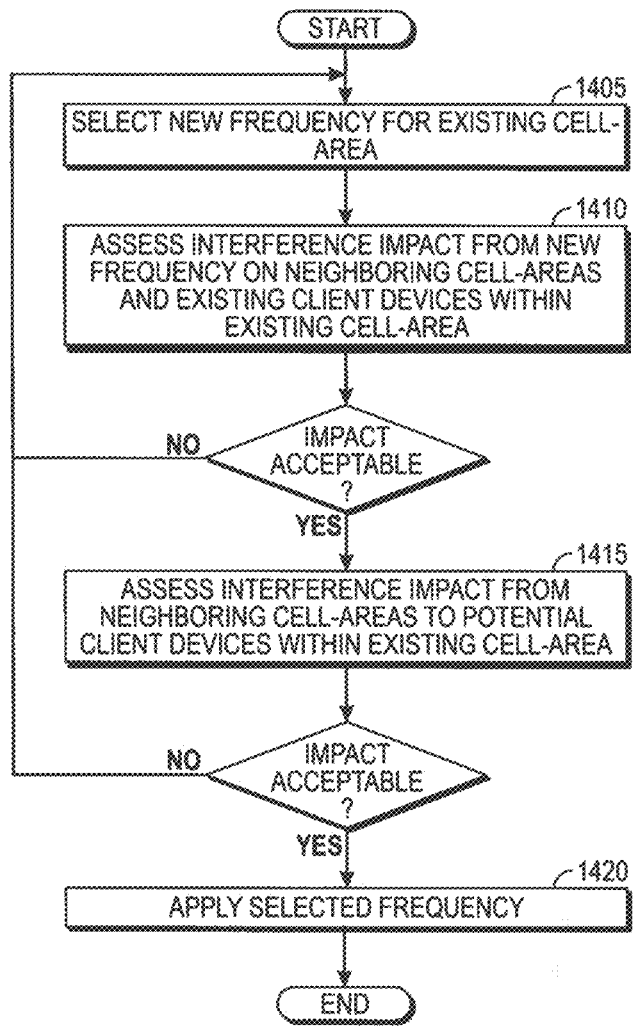
FIG. 14 is a flow chart illustrating an embodiment of the invention.

The steps of optimization according to this embodiment can be summarized as follows, with reference to the flow diagram in FIG. 14:
1. At step 1405, select a new frequency for an existing cell-area from a list of available frequencies;
2. At step 1410, assess the interference impact from the new frequency for the existing cell-area on the neighboring cell-areas (using the same frequency) and also on the existing client devices within the existing cell-area;
3. If the impact is unacceptable, go to 1405; otherwise, continue;
4. At step 1415, assess the interference impact from the neighboring cell-areas (using the same frequency) to potential client devices within the existing cell-area;
5. If the impact is unacceptable, go to 1405; otherwise, apply the selected frequency at step 1420.

Thus, one embodiment generally involves a method for changing a frequency at which to conduct communications between a base-station and a plurality of user equipment in an existing cell-area in a wireless network, comprising: selecting a new frequency for the existing cell-area; assessing an interference impact from the selected new frequency on neighboring cell-areas that conduct communications between base-stations and a plurality of user equipment using the same frequency as the selected new frequency; assessing an interference impact from the selected new frequency on existing ones of the plurality of user equipment in the existing cell-area; assessing an interference impact from the neighboring cell-areas that are using the same frequency as the selected new frequency to potential ones of the plurality of user equipment in the existing cell-area; and applying the selected new frequency to conduct the communications between the base-station and the plurality of user equipment in existing cell-area when the interference impact is acceptable responsive to the above assessing steps.

Similar to the case of finding the frequency of a new cell-area, several variations of the above optimization steps are possible.

Optimization for Multiple Cell-Areas

The steps described above for finding the frequency of a new cell-area or for changing the frequency of an existing cell-area can be extended to the case of optimizing the frequency allocation of multiple cell-areas simultaneously. The main change is that the list of available frequencies becomes a list of available frequency "vectors". Each element of the vector corresponds to frequency allocation for the respective cell area. The rest of the steps are similar, except that interference impact can be assessed on multiple cell areas.

Detection of Co-Linearity

Figure 10:
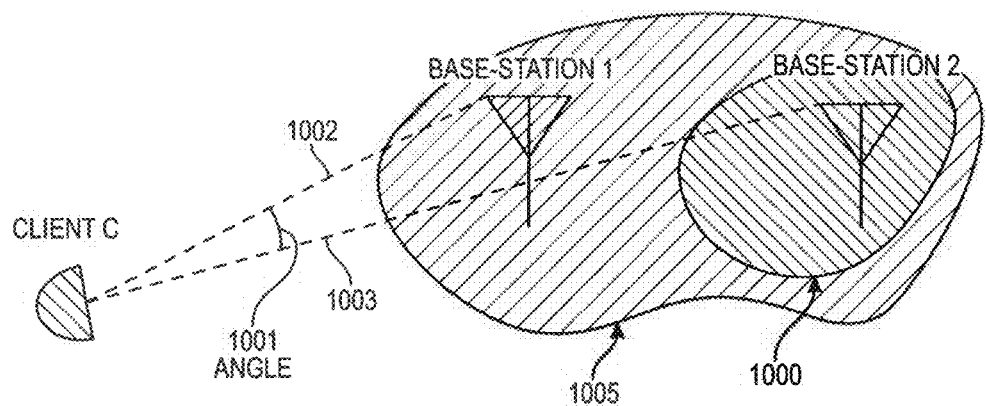
FIG. 10 illustrates a co-linearity condition between a client and two base stations in accordance with an embodiment of the invention.

It was earlier explained that inter-cell interference mitigation schemes such as Mimosa's SRS become less effective when devices have a certain geometric arrangement. FIG. 10 demonstrates the co-linearity condition for a client C and base-stations 1 and 2. In this example, the client C antenna is assumed to be directional, and the base-station antennas are assumed to be omni-directional. It is also assumed that base-station 2 communicates with client C, but that base-station 1 is within the extended interference area of client C. When the angle 1001 between the line 1002 from client C to base-station 1 and the line 1003 from client C to base-station 2 becomes small, then it is possible for the client C transmitter to cause interference to the base-station 1 receiver.

Conversely, it is possible for the base-station 1 transmitter to cause interference to the client C receiver. When the angle is equal to or smaller than the beam-width corresponding to the client C antenna pattern, then client C, base-station 1, and base-station 2 are said to be co-linear.

For a pair of base-stations 1 and 2, if there is any client C using base-station 1 such that client C, base-station 1, and base-station 2 are co-linear, then remedial action may be necessary. For example, such action can be changing the frequency of base-station 1 or base-station 2, or re-pointing the client C to a base-station other than base-station 1. If there is any client C using base-station 2 such that client C, base-station 1, and base-station 2 are co-linear, then similar remedial action may be necessary.

Figure 15:
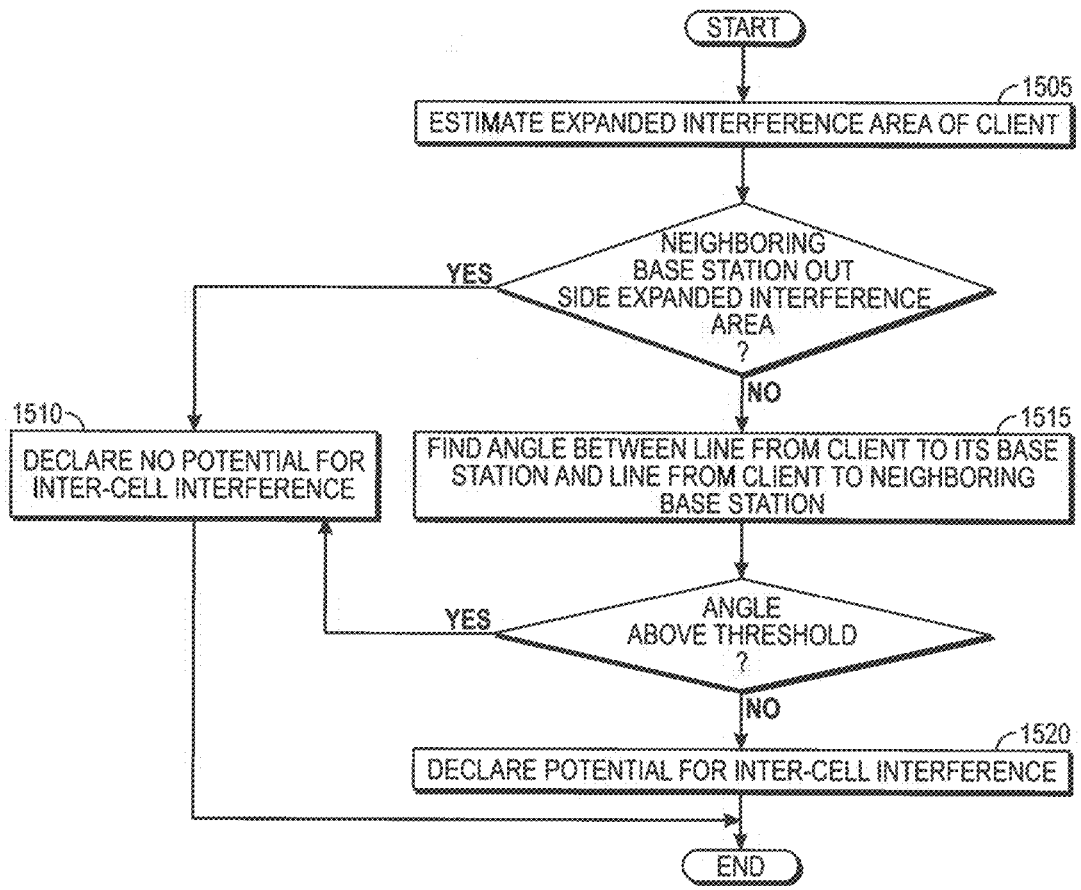
FIG. 15 is a flow chart illustrating an embodiment of the invention.

The detection of cases of co-linearity is useful for identifying the presence or the potential for inter-cell interference. Following is an example set of steps for identifying if there is potential for inter-cell interference between a client C and a neighboring base-station, according to an embodiment of the invention, with reference to FIG. 15:

1. At step 1505, estimate expanded interference area of client C;
2. If the neighboring base-station is outside the expanded interference area, then at step 1510 declare there is no potential for inter-cell interference; otherwise, proceed;
3. At step 1515, find the angle between the line from client C to its base-station and the line from client C to the neighboring base-station;
4. If the angle is above a defined threshold, then at step 1510 declare there is no potential for inter-cell interference; otherwise, at step 1520 declare there is potential for inter-cell interference.

Thus, one embodiment generally involves a method for identifying when there is a potential for inter-cell-area interference impact between a user equipment in a cell-area with a base-station in a neighboring cell-area, comprising: estimating an interference area for the user equipment; determining no potential for inter-cell-area interference impact between the user equipment in the cell-area and the base-station in the neighboring cell-area when the neighboring base-station is outside the interference area for the user equipment; determining an angle between a line between the user equipment and a base-station in the cell-area and a line from the user equipment to the base-station in the neighboring cell-area; determining no potential for inter-cell-area interference impact when the angle is above a threshold; and determining a potential for inter-cell-area interference impact when the angle is below the threshold.

The above method can be extended to take into account cases where the base-station antennas are directional. For example, if the neighboring base-station has such an antenna pattern that the client C falls outside it, then it can be declared that there is no potential for inter-cell interference.

Computing Environment

Figure 16:
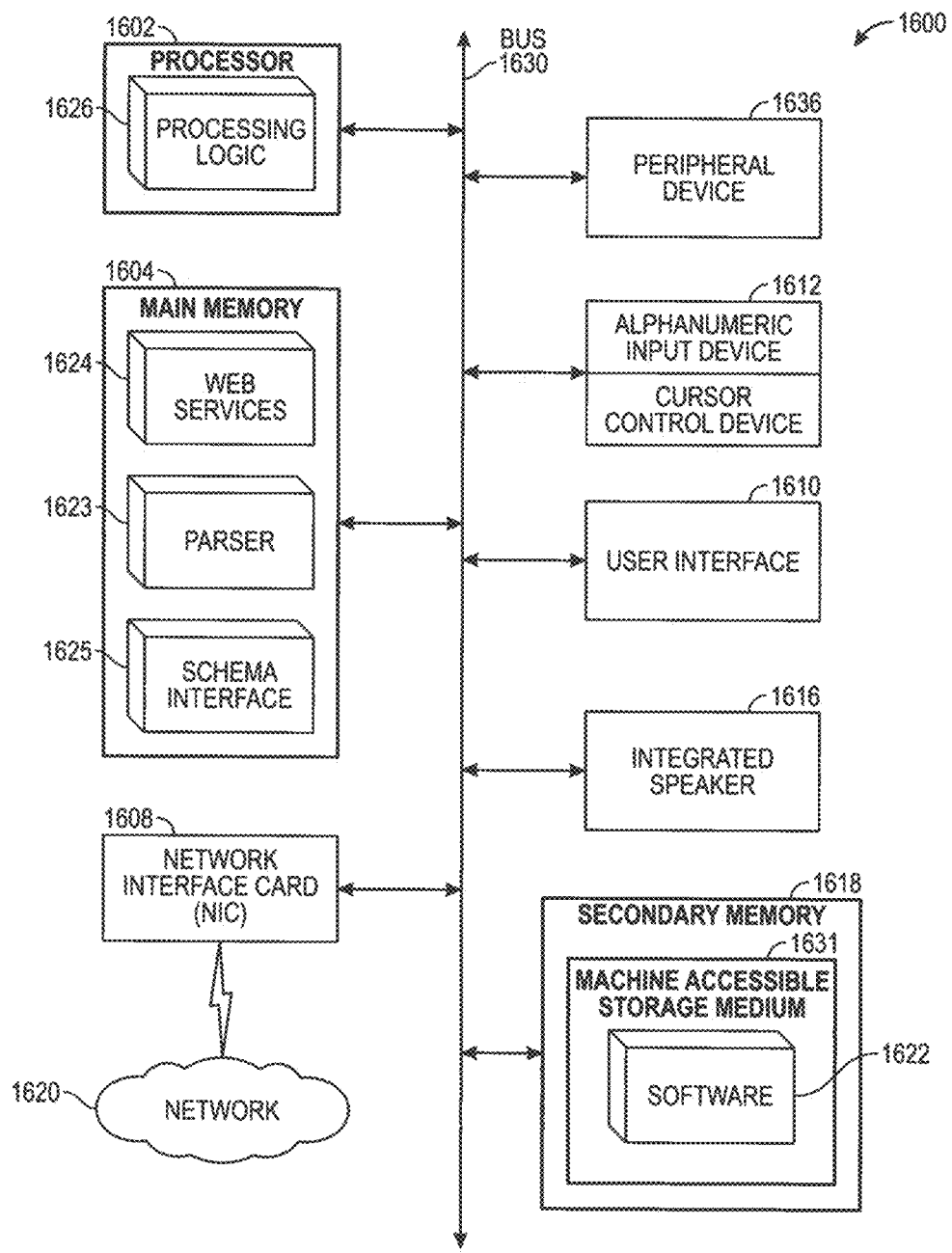
FIG. 16 illustrates a diagrammatic representation of a machine in the exemplary form of a computer system, in accordance with one embodiment of the invention.

FIG. 16 illustrates a diagrammatic representation of a machine 1600 in the exemplary form of a computer system, in accordance with one embodiment, within which a set of instructions, for causing the machine 1600 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1600 includes a processor 1602, a main memory 1604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 1618, which communicate with each other via a bus 1630. Main memory 1604 includes information and instructions and software program components necessary for performing and executing the functions with respect to the various embodiments of the systems, methods for implementing embodiments of the invention described herein. Instructions 1623 may be stored within main memory 1604. Main memory 1604 and its sub-elements are operable in conjunction with processing logic 1626 and/or software 1622 and processor 1602 to perform the methodologies discussed herein.

Processor 1602 represents one or more general-purpose processing devices such as a microprocessor, central processing unit, or the like. More particularly, the processor 1602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1602 may also be one or more special-purpose processing devices such as an application specific integrated circuit (ASIC), a field programmable gate array (FPGA), a digital signal processor (DSP), network processor, or the like. Processor 1602 is configured to execute the processing logic 1626 for performing the operations and functionality which are discussed herein.

The computer system 1600 may further include one or more network interface cards 1608 to interface with the computer system 1600 with one or more networks 1620. The computer system 1600 also may include a user interface 1610 (such as a video display unit, a liquid crystal display (LCD), or a cathode ray tube (CRT)), an alphanumeric input device 1612 (e.g., a keyboard), a cursor control device 1614 (e.g., a mouse), and a signal generation device 1616 (e.g., an integrated speaker). The computer system 1600 may further include peripheral device 1636 (e.g., wireless or wired communication devices, memory devices, storage devices, audio processing devices, video processing devices, etc.).

The secondary memory 1618 may include a non-transitory machine-readable storage medium (or more specifically a non-transitory machine-accessible storage medium) 1631 on which is stored one or more sets of instructions (e.g., software 1622) embodying any one or more of the methodologies or functions described herein. Software 1622 may also reside, or alternatively reside within main memory 1604, and may further reside completely or at least partially within the processor 1602 during execution thereof by the computer system 1600, the main memory 1604 and the processor 1602 also constituting machine-readable storage media. The software 1622 may further be transmitted or received over a network 1620 via the network interface card 1608.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via a memory and one or more processors of a computing platform.

Embodiments of invention also relate to apparatuses for performing the operations herein. Some apparatuses may be specially constructed for the required purposes, or may comprise a general purpose computer(s) selectively activated or configured by a computer program stored in the computer(s). Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct more specialized apparatus to perform the required methods. The structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method, comprising:
    selecting a cell-area in a wireless network that is or will be served by a base-station operating at a radio frequency;
    identifying a plurality of user equipment within the selected cell-area that are or can be served by the base-station;
    identifying potentially interfering devices operating at the same radio frequency as the base-station; and
    estimating an interference impact from the identified potentially interfering devices to communication between the base-station and each of the identified plurality of user equipment, comprising:
        identifying a viewshed for each of the identified potentially interfering devices;
        declaring an interference impact from each of the identified potentially interfering devices with respect to each of the identified plurality of user equipment or the base-station where the viewshed for at least one of the identified potentially interfering devices encompasses a location of one of the identified plurality of user equipment and the base-station;
        calculating an interference power as a function of a distance between one of the identified potentially interfering devices and one of the identified plurality of user equipment and the base-station where the one of the identified plurality of user equipment or the base-station is within the viewshed of the one of the identified potentially interfering devices; and
        calculating a cumulative interference impact based on the declared interference impact for each of the identified potentially interfering devices with respect to one of the identified plurality of user equipment and the base-station.

2. The method of claim 1, wherein identifying the plurality of user equipment within the selected cell-area that can be served by the base-station comprises choosing a plurality of locations within a viewshed of an antenna of the base-station at which the respective plurality of user equipment can be served by the base-station.

3. The method of claim 2, wherein the plurality of locations correspond to one or both of centroids of a respective plurality of land parcels, and points on roofs at which to mount an antenna within the plurality of land parcels.

4. The method of claim 3, wherein choosing the plurality of locations within the viewshed of the antenna of the base-station at which the respective plurality of user equipment can be served by the base-station comprises one of:
randomly choosing the plurality of locations among the plurality of land parcels within the base-station's viewshed;
choosing the plurality of locations among the plurality of land parcels associated with prospective customers that have expressed an interest in accessing the wireless network; and
choosing the plurality of locations for all of the plurality of land parcels within the base-station's viewshed.

5. The method of claim 1, wherein identifying potentially interfering devices operating at the same radio frequency as the base-station comprises identifying potentially interfering wireless devices located in one or more neighboring cell-areas in a wireless network that are operating at the same radio frequency as the base-station.

6. The method of claim 5, wherein identifying potentially interfering wireless devices located in one or more neighboring cell-areas in a wireless network that are operating at the same radio frequency as the base-station comprises identifying one of: one or more base-stations, and one or more user equipment.

7. The method of claim 1, wherein estimating the interference impact from the identified potentially interfering devices to communication between the base-station and the identified plurality of user equipment comprises one of:
estimating the interference impact from the identified potentially interfering devices to downlink communications between the base-station and the identified plurality of user equipment; and
estimating the interference impact from the identified potentially interfering devices to uplink communications between the base-station and the identified plurality of user equipment.

8. The method of claim 1, further comprising:
declaring an interference impact from at least two of the identified potentially interfering devices with respect to one of the identified plurality of user equipment and the base-station where the respective viewsheds for the at least two of the identified potentially interfering devices encompass a location of the one of the identified plurality of user equipment and the base-station.

9. The method of claim 1, further comprising:
declaring an interference impact to communication between the base-station and one of the identified plurality of user equipment from the identified potentially interfering devices with viewsheds that encompass a location of the one of the identified plurality of user equipment and the base-station.

10. The method of claim 1, comprising:
expanding the identified viewshed by a buffer zone to produce an expanded interference area for each identified potentially interfering devices;
declaring the interference impact from each of the identified potentially interfering devices with respect to each of the identified plurality of user equipment or the base-station further where:
the expanded interference area for at least one of the identified potentially interfering devices encompasses a location of one of the identified plurality of user equipment and the base-station.

11. The method of claim 10, wherein the buffer zone is calculated according to one of:
geometrically enlarging the viewshed for each of the identified potentially interfering devices; and
modeling how the interfering radio frequency signal is affected by one or more of: scattering, refraction, diffraction, and absorption, and finding a boundary where the modeled interfering radio frequency signal falls below a threshold.

12. The method of claim 1, further comprising:
calculating a received signal power of a transmission between the base-station and each identified plurality of user equipment; and
computing one of a signal to interference ratio (SIR) and a signal to interference plus signal to noise ratio (SINR) based on the calculated received signal power and the cumulative interference impact for each identified plurality of user equipment.

13. The method of claim 12, further comprising assessing an interference impact for communication between the base-station and each of the identified plurality of user equipment.

14. The method of claim 13, wherein assessing the interference impact for communication between the base-station and each of the identified plurality of user equipment comprises one of:
comparing the cumulative interference power at each of the identified plurality of user equipment to a threshold, and ranking the interference impact as acceptable or unacceptable;
comparing one of the SIR and the SINR to a threshold, and ranking the interference impact as acceptable or unacceptable; and
comparing one of the SIR and the SINR to a previously recorded or calculated respective value of one of the SIR and the SINR, and ranking the interference impact as acceptable or unacceptable based on whether degradation or improvement is observed relative to the previous value.

15. The method of claim 14, further comprising assessing an aggregate interference impact for all of the identified plurality of user equipment according one of the following calculations:
counting a number of user equipment that exhibit unacceptable interference impact;
counting a percentage of user equipment that exhibit acceptable interference impact; and
counting a number of user equipment corresponding to existing installations of user equipment that exhibit unacceptable interference impact.

16. A non-transitory computer readable storage media having instructions stored thereon that, when executed by a processor of a system, the instructions cause the system to perform operations comprising:
selecting a cell-area in a wireless network that is or will be served by a base-station operating at a radio frequency;
identifying a plurality of user equipment within the selected cell-area that are or can be served by the base-station;
identifying potentially interfering devices operating at the same radio frequency as the base-station; and
estimating an interference impact from the identified potentially interfering devices to communication between the base-station and each of the identified plurality of user equipment, comprising:
identifying a viewshed for each of the identified potentially interfering devices;
declaring an interference impact from each of the identified potentially interfering devices with respect to each of the identified plurality of user equipment or the base-station where the viewshed for at least one of the identified potentially interfering devices encompasses a location of one of the identified plurality of user equipment and the base-station;

calculating an interference power as a function of a distance between one of the identified potentially interfering devices and one of the identified plurality of user equipment and the base-station where the one of the identified plurality of user equipment or the base-station is within the viewshed of the one of the identified potentially interfering devices; and calculating a cumulative interference impact based on the declared interference impact for each of the identified potentially interfering devices with respect to one of the identified plurality of user equipment and the base-station.

17. The non-transitory computer readable storage media of claim 16, wherein identifying the plurality of user equipment within the selected cell-area that can be served by the base-station comprises choosing a plurality of locations within a viewshed of an antenna of the base-station at which the respective plurality of user equipment can be served by the base-station.

18. The non-transitory computer readable storage media of claim 16, wherein identifying potentially interfering devices operating at the same radio frequency as the base-station comprises identifying potentially interfering wireless devices located in one or more neighboring cell-areas in a wireless network that are operating at the same radio frequency as the base-station.

19. The non-transitory computer readable storage media of claim 16, wherein estimating the interference impact from the identified potentially interfering devices to communication between the base-station and the identified plurality of user equipment comprises one of:

estimating the interference impact from the identified potentially interfering devices to downlink communications between the base-station and the identified plurality of user equipment; and estimating the interference impact from the identified potentially interfering devices to uplink communications between the base-station and the identified plurality of user equipment.

* * * * *